United States Patent [19]
Denis

[11] 3,915,209
[45] Oct. 28, 1975

[54] MACHINE FOR HARVESTING TREES AND BRUSHWOOD

[75] Inventor: Bernard Denis, Annecy, France

[73] Assignee: C.E.M.E.T. S.A., France

[22] Filed: Apr. 15, 1974

[21] Appl. No.: 461,231

[30] Foreign Application Priority Data
Apr. 13, 1973 France .............................. 73.13485
Feb. 22, 1974 France .............................. 74.06187

[52] U.S. Cl. ................... 144/34 R; 83/843; 83/848; 83/928; 144/3 D; 144/222; 144/230; 144/231
[51] Int. Cl.² ........................................ A01G 23/08
[58] Field of Search ............ 83/491, 698, 848, 843, 83/928, 699; 144/3 D, 34 R, 34 E, 309 AC, 218, 222, 223, 236, 230, 231

[56] References Cited
UNITED STATES PATENTS

| | | | |
|---|---|---|---|
| 195,699 | 10/1877 | Burger | 83/843 |
| 2,560,174 | 7/1951 | Jorsch | 144/231 |
| 3,181,577 | 5/1965 | Gaskins | 144/222 |
| 3,238,981 | 3/1966 | Larson et al. | 144/34 R |
| 3,463,206 | 8/1969 | Briggs et al. | 83/843 |
| 3,494,389 | 2/1970 | Thibodeau | 83/928 X |
| 3,575,222 | 4/1971 | Tucek | 144/34 R |

Primary Examiner—Robert L. Spruill
Assistant Examiner—W. D. Bray
Attorney, Agent, or Firm—Robert E. Burns; Emmanuel J. Lobato; Bruce L. Adams

[57] ABSTRACT

A device for harvesting trees and brushwood comprises a self-propelled tractor carrying a support frame which is capable of pivoting around a primary vertical axis and a secondary horizontal axis perpendicular to a plane of symmetry of the apparatus. A cutting device, comprising a cutting ring, is fixed to the lower part of the support and means are provided to drive the cutting ring, a pair of claws are carried in a groove provided in the support and an arm is mounted on an upper part of the support for movement around a vertical axis. The cutting device includes two circular coaxial plates axially separated from each other by an axial dimension at least equal to the axial dimension of the cutting ring. The plates are joined together at their outer edges by guide rollers which cover the circular opening of the cutting ring, where driving cogs and a toothed pinion are located. The cutting tools are replaceable and are fixed to the ring on its outer edge by independent locking devices which extend radially toward the outer circumference of the ring and are spaced regularly around the axis of revolution of the ring at at least one level.

16 Claims, 8 Drawing Figures

MACHINE FOR HARVESTING TREES AND BRUSHWOOD

BACKGROUND OF THE INVENTION

The present invention relates to improvements in mobile self-propelled vehicles and machines for harvesting wood of the type consisting of a self-propelled tractor carrying a movable platform on which are mounted equipment for grasping brushwood and trees and means for cutting trees which have been grasped.

Machines of this general type are already known and have been described, in particular in French Pat. No. 1,555,911 and in U.S. Pats. Nos. 3,238,981 and 3,575,222.

In French Pat. No. 1,555,911 the cutting equipment consists of a chain saw driven by a motor mounted on an angled support hinged to the platform and normally positioned vertically around a vertical axis. A hydraulic jack acts on the angled support in order to rotate it around its hinged axis alternatively in one direction and then the other.

In U.S. Pat. No. 3,238,981, the cutting arrangement is of the same general type as that described above, the hydraulic jack being replaced by a second motor, also on a vertical axis.

In U.S. Pat. No. 3,575,222 the cutting device consists of two cutting blades mounted in the same plane, each of the blades being hinged on a vertical axis, the blades being subjected to the action of hydraulic means which effect the separation and the closing together of the blades.

However, these known cutting devices do not give complete satisfaction for the following reasons:

the cutting power is weak (particularly in the case of U.S. Pat. No. 3,575,222), because of the nature of the system used — an alternating back and forth movement with a chain saw or a blade;

the maximum area of cut is likewise small and limited by the nature of the cutting elements, in which any increase in the size of the components leads to a corresponding decrease in ruggedness of the apparatus;

replacement of the cutting parts is difficult and involves the whole assembly even when some parts are only slightly damaged;

adjustment of the cutting parts progressively to compensate for wear and tear is not possible; and protection for the cutting parts is poor or non-existent.

Moreover, in U.S. Pat. No. 3,494,389 and German Pat. No. 900,493 there is described a cutting device of a type consisting of a U-shaped frame into which is guided a cutting ring with a serrated outer circumference which is driven by a toothed pinion whose teeth engage in the driving cogs on the inside of the ring, the whole being pivotally mounted near its centre on a frame.

However, this type of cutting device is also not completely suitable for a mobile self-propelled machine for harvesting wood for the following reasons:

the dimensions of the frame are larger than the axial dimension of the serrated ring which limits the penetration of the latter into the wood to be cut;

the central part of the ring is in no way protected from wood particles or other material which might possibly interfere with its proper functioning; and as in the case mentioned above replacement of the cutting parts is difficult, replacement of the whole assembly being required and it is impossible to make compensating adjustments to the parts.

The object of the invention, therefore, is to provide a self-propelled machine for harvesting wood which does not possess the disadvantages noted above.

SUMMARY OF THE INVENTION

The machine or vehicle consists of a mobile self-propelled tractor to the front of which is attached a support frame normally held in a vertical position. The support frame has the capability of pivoting around a first vertical axis and a second horizontal axis which is perpendicular to the principal plane of symmetry of the machine a cutting device is fixed to the lower part of the support frame and is driven by a motor. A pair of claws which can be variably spread apart are slidably mounted in a groove along the central part of the support frame, and an arm is mounted on the upper part of the support frame around a vertical axis. Primary and secondary means are provided for moving these elements. The primary means serves to open and close the pair of claws and to make them slide along the groove. The secondary means is provided to make the arm swing around. The device for cutting consists of a circular ring guided by rollers which are placed in the central part of the ring. An internal circular edge of the ring is provided with driving cogs which mesh with a toothed pinion driven by a motor. The invention is characterized by the fact that the cutting device in addition comprises two circular coaxial plates fixed to the support frame at their outer edges, axially separated from each other, the axial dimensions at their widest being equal to the axial dimension of the ring. The two plates are joined together at their circumference by the guide rollers. They cover the circular opening in the ring where the driving cogs and the toothed pinion are located, thus protecting them. Replaceable cutting tools are fixed to the ring on its outer circumference by means of independent locking devices, pointing radially outward toward the outer edge of this ring and distributed evenly around its axis of revolution at at least one level.

BRIEF DESCRIPTION OF THE DRAWINGS

The invention will now be described with reference to the accompanying drawings wherein.

DESCRIPTION OF THE PREFERRED EMBODIMENT

Figure 1:
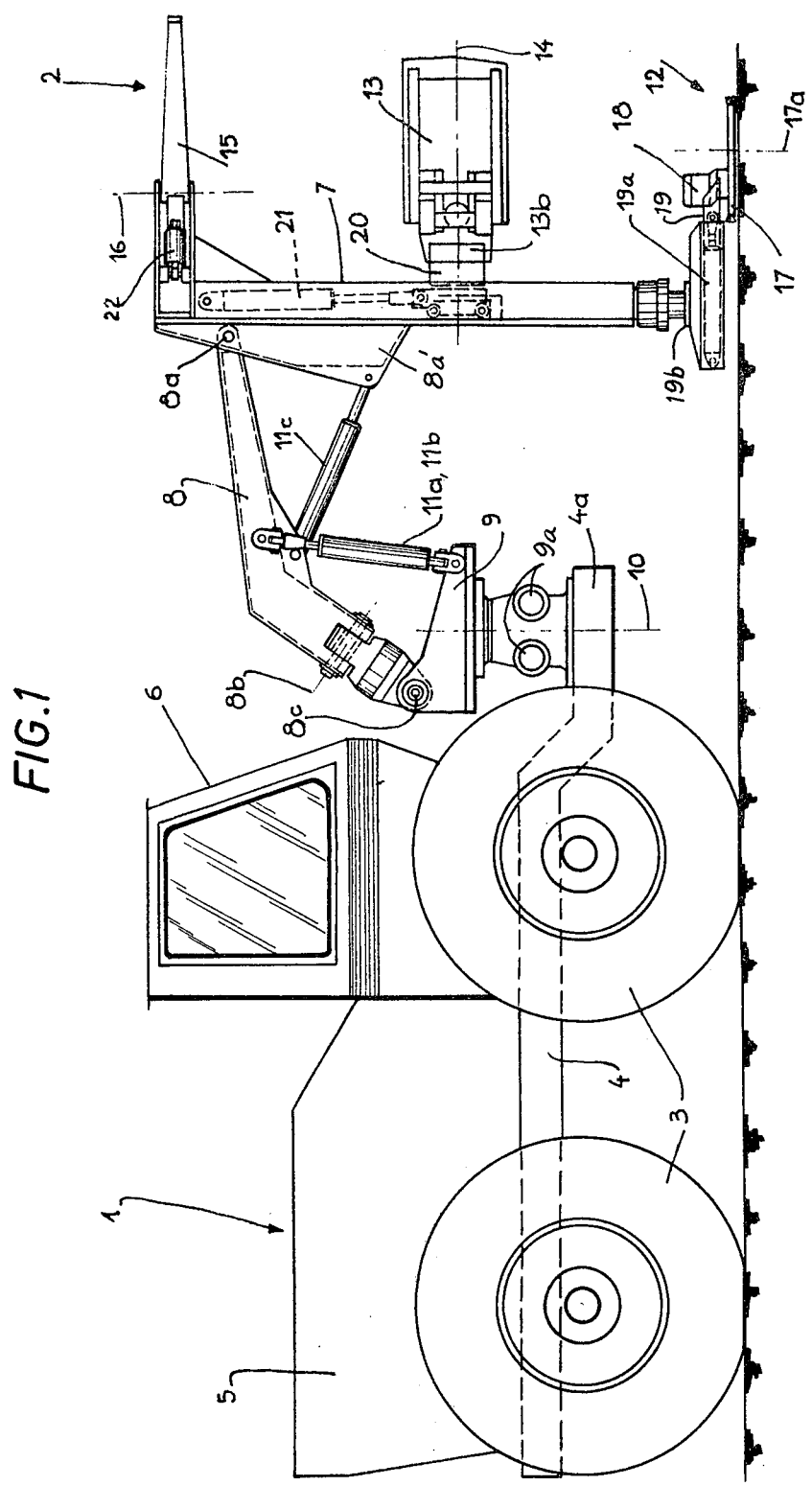
FIG. 1 is a side view of a mobile self-propelled machine for harvesting wood in accordance with the invention.

FIG. 1 shows a mobile self-propelled machine for harvesting wood consisting of a self-propelled tractor 1 at the front of which is pivotally mounted apparatus 2 for gripping and cutting trees and brush.

The tractor 1 of known type consists of ground-engaging wheels 3 supporting a chassis 4 on which is carried an engine assembly 5 and an operator's cab 6, within which are the control levers to drive the tractor 1 and to operate the device 2. The device 2 consists of a support frame 7 of a generally parallelipiped shape normally held in a substantially vertical position, pivotally mounted at 8a, by an end of rearwardly extending arms 8a', on a support arm 8 for pivotal movement around a horizontal axis which is perpendicular to a plane defined by the support frame 7 and the support arm 8, which plane from now on will be called the plane of principal symmetry.

Support arm 8 is pivotally mounted at a lower rear extremity around two axes 8b and 8c which are perpendicular to each other and positioned, respectively, within and perpendicular to the plane of principal symmetry on a base 9. The base is pivotally mounted at the forward end 4a of the chassis 4 for rotation around a substantially vertical axis 10 which is also positioned in the plane of principal symmetry.

Jacks or hydraulic cylinders 11a, 11b, 11c, the first two of which are pivotally secured to base 9 and the support arm 8 and the third of which is hinged to the arm 8 and the support frame 7, are provided for pivoting the support 7 on the base 9 in every direction, in particular around a horizontal axis perpendicular to the plane of principal symmetry. As base 9 can be pivoted at 9a around the vertical axis 10, the support 7 can be positioned pointing forward, or to one side, or to the other, either as a forward extension of the tractor or in any intermediate position desired. The combination of the different pivotal movements possible for the support 7 allows the machine 2 to be oriented in any attitude which may be necessary or suitable for gripping trees and brushwood and for cutting the stems thereof in a plane at approximately right angles to the stems as is known from the earlier patents mentioned above.

The remainder of the description describes the support 7 as being in a vertical position and it will be understood that it can, as indicated, occupy any other position.

The machine comprises a cutting device generally shown at 12 carried by the support 7 at its lower end, and a pair of claws 13 reciprocally movable with respect to each other, mounted in a longitudinal groove in the support 7, and capable of pivoting around a horizontal axis 14 positioned in the plane of principal symmetry. In addition, an arm 15 is pivotally secured to the upper part of the support 7 about a vertical axis 16.

The cutting device 12 which will be described in detail below, consists of a cutting disc 17 driven in a rotary movement around a vertical axis 17a by a motor 18 carried by a platform 19 which is detachably mounted in normally horizontal longitudinal grooves 19a on the lower end 19b of the support 7.

The pair of claws 13 are carried by a carriage 20 which is slidably mounted in a longitudinal, normally vertical groove in the support 7 and movable by means of jack or cylinder 21. Naturally any type of device other than a jack which will ensure the same action is within the spirit of the invention, such as chains, etc. Other jacking devices, hinged rods and rotor 13b are utilized, in one instance, to spread apart the claws 13 and, in another instance to make the carriage 20 pivot around a horizontal axis 14.

The arm 15, hinged around vertical axis 16, is positioned laterally to one side in relation to the plane of principal symmetry. A jack 22 extends between the arm 15 and the support 7 to effect pivoting of the arm.

The operation of the various motors, jacks, etc., or similar equipment is suitably controlled from the cab 6.

The method of operation of the mobile self-propelled machine in accordance with the invention is as follows:

The cutting device 12 is placed near a clump of brushwood trees after suitable positioning of the support 7. The claws 13 grasp the small trees in order to dispose them in a bundle or sheaf and the trees are then cut. The lower ends of the cut trees are gradually disengaged from the cutting disc 17 by raising the pair of claws 13. After initial cutting, the arm 15 may be swung around in order to bring in another tree toward the trees which have already been cut off with the object of adding to the bundle being formed and cut.

Once a sufficiently large cut bundle has been formed the operator makes the support arm 8 and thereby the support frame 7 pivot around axis 10 in order to bring the bundle to the side of the machine. Then the pair of claws 13 pivot around axis 14 in order to lay the bundle horizontally. The carriage 20 is lowered, following which the claws 13 are opened in order to free the aforesaid bundle which then falls on the ground away from interfering with further progress of the machine.

The present machine harvest brushwood in the manner of a reaper, not by moving in succession from tree to tree as is done by current methods.

The invention can be the subject of numerous variations as far as the tractor itself is concerned, and also in the means for holding and positioning the support 7, the pair of claws 13, the arm 15, the cutting device 12.

FIGS. 2, 3, 4, and 5 show a preferred form of embodiment but not a limiting one, of the cutting device 12 in which this device 12 consists of a ring 22 rotatable around an imaginary axis of revolution 17a, and to which are attached by locking devices (which are an object of the invention), cutting blades 23 regularly angularly spaced apart peripherally of the ring each blade being substantially situated within the same plane as the ring, pointing radially outwardly from the latter and working in the manner of the teeth of a milling cutter. The ring 22 is mounted and guided by rollers 24 whose axes 24a are fixed to two upper and lower plates 25a and 25b, (one of which is removable if required). Both plates 25a and 25b have a circular shape and are of the same dimensions. The plates are co-axial with the axis 17a and are axially separated from each other by an axial dimension at least equal to that of the ring, 22. They cover the inner circular opening of the ring and protect, as will be seen below, the mechanism for driving the ring. The two plates are joined at their circumference by the axes 24a. The ring 22 is provided with driving cogs 26 on an inner circular circumference 26a which cogs point toward the axis 17a and mesh along a circle 26b with the teeth of a toothed pinion 27 driven by motor 18 in rotary movement around its axis of revolution 27a which is parallel to and separated from the axis 17a, being disposed between the support platform 19 and the axis 17a. In this manner the guiding and driving components 24, 26, 27 of the ring 22 situated around the axis 27a do not interfere with the penetration of the ring and plates 22, 25a and 25b into the wood being cut. The depth of penetration can be made considerably wider than the width by suitably dimensioning the pinion 27 and of the ring 22 must the distance between the axes 17a and 27a. Moreover, the plates 25a and 25b protect the driving cogs 26 and the toothed pinion 27 and prevent the introduction of undesirable wood, sawdust, and wood chips, likely to interfere with satisfactory operation of the cutting device or to damage the blades.

The toothed pinion 27 is journalled in bearings 28a and 28b fitted into the plates 25a and 25b, and the pinion is driven in rotary movement by shaft 29 coupled to the motor 18 either directly or by means of suitable transmission.

Figures 2, 3:
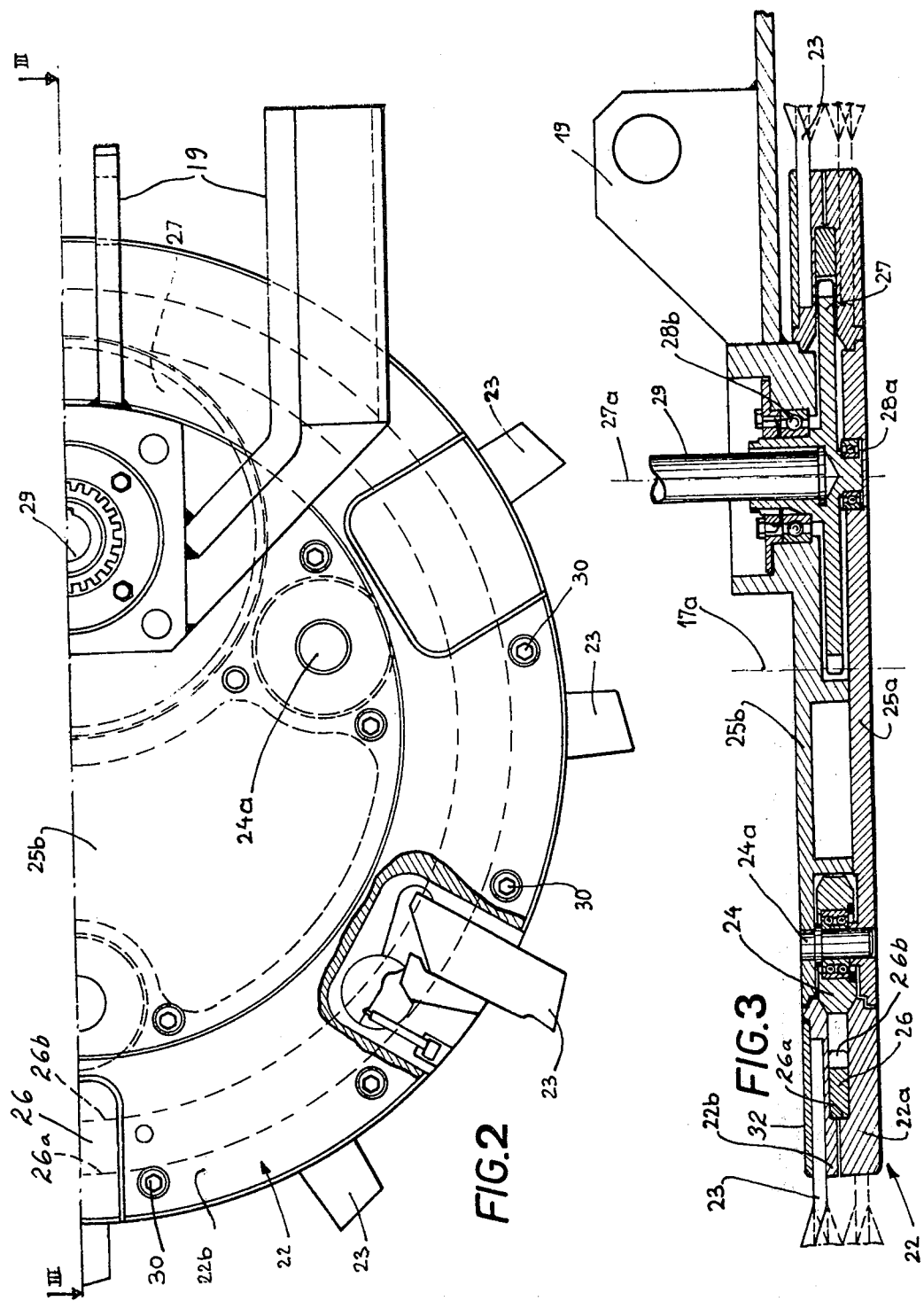
FIG. 2 is an enlarged plan view of one half of the cutting device shown generally in FIG. 1.
FIG. 3 is a sectional view of the cutting device taken along the line III—III of FIG. 2.

The ring 22 preferably consists of a lower, thinner ring 22a and an upper, thinner ring 22b, coaxially joined together by any mechanical means such as peripherally distributed bolts or screws 30. In FIG. 3 there are represented two levels of blades 23, but a different number of levels might be provided as will be described below. The motor 18 is either placed at the point of balance of the disc 22 or else separated from the latter (FIG. 1). The driven shaft of the motor is either merged with the axis 27a or else separated from the latter, for example by a distance greater than that separating it from the axis 17a.

Figure 4:
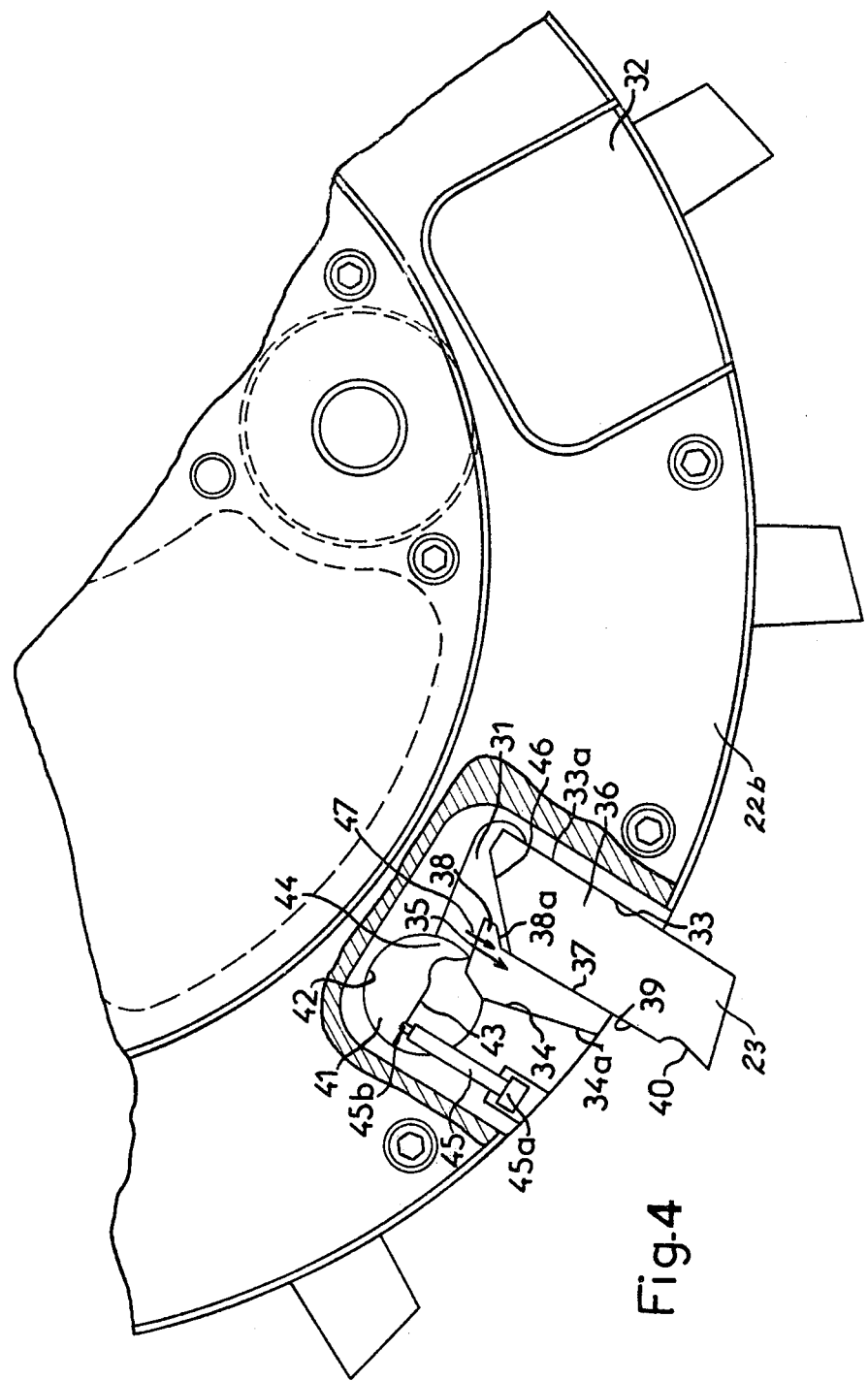
FIG. 4 is an enlarged plan view of a locking device for one blade assembly of the cutting device.

In FIG. 4 there is represented a preferred embodiment of the new locking device for a blade 23 on the ring 22b. This blade is kept in a slot 31 of the ring covered by a removable disc 32.

The slot 31 is limited by a radial edge 33 and an inclined edge 34. These two edges converge toward the outer circumference of the ring.

Between the two edges 33 and 34 and in the slot 31 there are located a wedge 35 and the main body 36 of the blade 23.

The point of the wedge points toward the outer circumference of the ring, its first side 34a rests against the edge 34 of the slot 31 and its second side 37, as will be shown below, rests against the main body of the blade. This second side is joined to the base of the wedge by a projection 38 which can be brought to rest against the blade 23.

The blade is limited by a first edge 33a supported against the radial slot edge 33 and a second edge 39 whose end part constitutes an active cutting element 40. The two edges 33a and 39 of the blade converge toward the outer circumference of the ring. The angle formed by these two edges is, however, smaller than the angle of the wedge 35 formed by the two sides 34a and 37.

The locking device also includes a nut or cam 41 of generally semi-circular shape. This member can be turned freely in a cavity 42 of generally circular shape and which is hollowed out of the ring 22b and opens into the slot 31. One end of the cam 41 is delimited by a diametrical front 43, and the circular part sliding in the cavity 42. The other end is curved in such a way as to form a point or beak 44 pointing toward and resting against the base of the wedge 35.

A screw 45 is screwed into a hole tapped substantially radial to the cavity in such a way that its head 45a is accessible from the outside of the ring and its inner point 45b rests against the diametrical front 43 at the end diametrically opposite to the point 44.

The two edges 33a and 39 of the main body 36 of the blade are joined by a transverse edge 46 substantially inclined at a 45° angle to the edge 33a and having one end, shown at right, extending freely into the deepest inside portion of slot 31. At the other end of beading 46 the projection 38 is connected to the second slide 37 of the wedge by an edge 38a likewise inclined at an angle of about 45°. Consequently, the inclined edges 46 and 38a are substantially parallel.

The method of operation of the locking device is as follows: In order to lock the blade 23 in its slot 31 one tightens the screw 45 in its threaded hole. This initiates rotation of the cam 41 in the cavity 42 in a clockwise direction. The point 44 is consequently moved in the direction of the radial arrow 47 pointing toward the outer circumference of the ring. This point 44 rests against the base of the wedge 35, and the wedge is consequently urged toward the outer circumference of the ring while sliding up the slot edge 34. The second side 37 of the wedge rests against the second edge 39 of the cutting tool and this second edge is, as indicated above, lightly inclined toward the first edge 33a. Thus the movement of the wedge 35 toward the outer circumference of the ring effects locking of the blade 23 by tightening it between the wedge and the slot edge 33.

As a result of the fact that the slot edges 33 and 34 converge, the blade, once locked, is prevented from moving toward the outer circumference of the ring 22.

The movement of the wedge 35 toward the outer circumference of the ring likewise has the effect of pressing the projection 38 against the blade 23 which prevents the blade from being displaced radially and towards the centre of the ring, that is to say, to penetrate further into the slot 31.

Changing blades is accomplished by unscrewing the screw 45 by working on the head 45a from the outer edge of the ring in such a way as to free the cam 41 and then to unlock the wedge and the blade.

Figure 5:
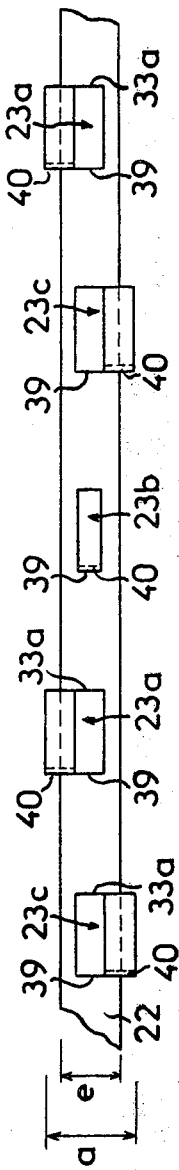
FIG. 5 is a schematic view illustrating the positioning of the blades of the cutting device.

FIG. 5 schematically represents part of the ring 22 illustrating three types of blades 23a, 23b, 23c respectively bent upwardly, straight out in the plane of the ring 22, and bent downwardly.

The cutting edges 40 of the blades 23a and 23c are respectively situated above and below the upper and lower faces of the ring 22. Consequently the size of the cut or gap a is greater than the thickness e of the ring which allows for cutting deeper into wood without binding.

Naturally, the ring 22 can comprise several levels of blades 23a, 23b, 23c.

Figure 7:
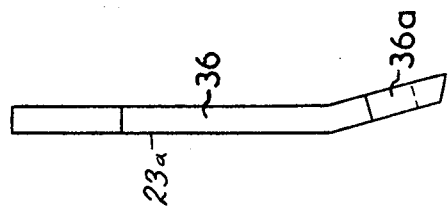
FIG. 7 is a side view of the blade shown in FIG. 6.
Figure 6:
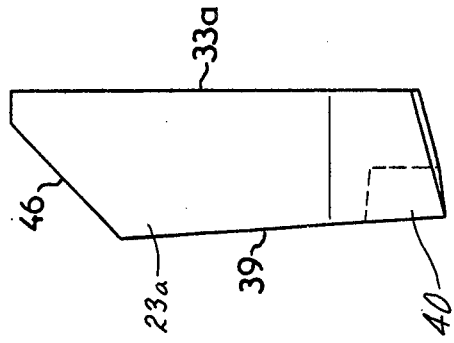
FIG. 6 is a plan view of a bent blade.

FIGS. 6 and 7 are respectively a plan view and a profile view of a blade bent in the manner of blade 23a as represented in FIG. 7. The angle formed by the two converging edges 33a and 39 is of the order of several degrees, 3°, for example. The inclination of the transverse inclined edge 46 to the edge 33a is of the order of 45°. Finally, the obtuse angle formed by the main body 36 of the blade and the outer curved part 36a comprising the cutting area 40 is of the order of 165°.

Figure 8:
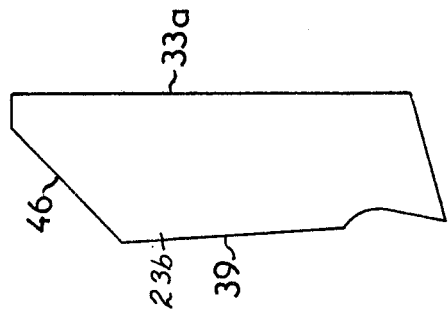
FIG. 8 is a plan view of a straight blade.

FIG. 8 shows a straight blade such as blade 23b, which has general dimensional characteristics substantially identical with the blades represented in FIGS. 8 and 9.

In accordance with one variation the ring 22 may be replaced by a single disc (not shown) of large diameter supporting cutting blades and which is keyed onto a shaft driven by a hydraulic motor. On this disc there are fixed at least two rows of blades respectively pointing upwardly and downwardly. Possibly a third row of blades could be provided in the same plane as the disc. Several discs with two or three rows of blades could be keyed onto the same shaft and consequently driven simultaneously.

If necessary a feed rate control could be provided for the cutting head carried by the platform 19. This feed rate could be obtained either by transferring the cutting head into the plane of symmetry of the machine or by sweeping the head around a vertical axis.

The embodiments of the invention in which an exclusive property or privilege is claimed are defined as follows:

1. A machine for harvesting trees and brushwood, comprising a cutting device disposed to be mounted on a vehicle, by a support and thereby to be oriented for cutting stems of trees and brushwood, the cutting device comprising;

a circular cutting ring;
guide roller means within the ring for rotationally guiding the ring;
driving cogs on an inner circular edge of the ring;
a toothed pinion meshing with the driving cogs and disposed to be driven from the support;
two circular coaxial plates axially separated from each other by an axial dimension at least equal to the axial dimension of the ring, the plates being jointed to each other at their outer edges by the guide roller means and covering the space surrounded by the ring wherein the driving cogs and the toothed pinion are located,
replaceable cutting tools fixed to the ring on its outer edge; and mutually independent locking means in the ring extending radially towards the outer circumference of the ring and being spaced regularly around said circumference for fixing the cutting tools to the ring on at least one level to lock the tools to the ring.

2. A machine in accordance with claim 1, wherein each cutting tool has a first side edge and a second side edge and each locking means comprises;

means defining a recess in the ring;
a wedge in said recess whose point extends toward the outer circumference of the ring, said recess and wedge having edges which cooperate with the first and second edges of the tool to engage the tool in the recess, and
means accessible from the outer edge of the ring for moving the wedge in the recess to lock the tool in the recess to the ring.

3. A machine in accordance with claim 2, wherein the wedge has a base in the recess and a projection on the base pointing outwardly, the tool having a third edge, in the recess, which is normally engaged by said projection.

4. A machine is accordance with claim 3, wherein the means for moving the wedge in the recess consist of a generally semi-circular nut rotatable within the recess and whose diametrical front faces the outer edge of the ring said nut having a first end curved to provide a point resting on the base of the wedge, and a screw threadedly engaging the ring, having a head accessible from the outside of the ring and having a point which rests against the diametrical front at an end of said diametrical front of the nut opposite said first end.

5. A machine in accordance with claim 3, wherein the first and second side edges of each tool converge toward the outer circumference of the ring, and extend into the recess to different radial extents.

6. A machine in accordance with claim 2, wherein each tool has a cutting part inclined from a body part of the tool, the body part being seated in the recess and disposed in a plane parallel with the circumference of the ring.

7. A machine in accordance with claim 6, wherein said tools comprise three types of blades, one being bent upwardly, another being situated within the plane of the ring, and the third being bent downwardly.

8. A machine in accordance with claim 6, wherein the tools comprise two types of blades, respectively bent toward the upper circular face and the lower circular face of the ring.

9. A machine in accordance with claim 8, wherein the blades are bent upwardly and downwardly beyond the axial dimension of the ring.

10. A machine in accordance with claim 8 wherein the ring comprises several coaxial rings each having one of the types of tools thereon.

11. A machine in accordance with claim 1, including support means having horizontal and longitudinal grooves for removably mounting the cutting device on the support means.

12. A machine in accordance with claim 1, including a drive motor for the cutting device having a driven shaft coaxial with the axis of the toothed pinion.

13. A machine in accordance with claim 1, including a drive motor for the cutting device having a driven shaft between the support and the axis of the ring and parallel to said axis.

14. A machine in accordance with claim 1, having a support for the cutting device, a pair of claws, and means for mounting the pair of claws on the support pivotally around a horizontal axis perpendicular to a plane of symmetry of the machine, for pivoting the claws, relative to the cutting device, in said plane.

15. A machine in accordance with claim 1, wherein the pair of claws are hinge-mounted on a carriage guided by and sliding on the support and held by a jack hinged to the support and to the carriage.

16. A machine in accordance with claim 15 including an arm mounted on the support for movement about an axis parallel to and laterally removed to one side of a plane of symmetry of the machine, the arm having a free end normally pointing in the direction of said plane of symmetry.

* * * * *